United States Patent [19]

Maroni et al.

[11] Patent Number: 4,762,694

[45] Date of Patent: Aug. 9, 1988

[54] MOLTEN SALT EXTRACTION PROCESS FOR THE RECOVERY OF VALUED TRANSITION METALS FROM LAND-BASED AND DEEP-SEA MINERALS

[75] Inventors: Victor A. Maroni, Naperville, Ill.; Samuel von Winbush, Huntington, N.Y.

[73] Assignee: The United States of America as represented by the United States Department of Energy, Washington, D.C.

[21] Appl. No.: 88,525

[22] Filed: Aug. 21, 1987

Related U.S. Application Data

[63] Continuation of Ser. No. 44,618, May 1, 1987, abandoned.

[51] Int. Cl.[4] .............................................. C01G 45/00
[52] U.S. Cl. ..................................... 423/50; 204/64 R; 75/10.28; 75/10.4; 75/10.64; 75/63; 75/72; 75/62; 75/80
[58] Field of Search ................. 204/64 R, 71; 723/23, 723/35, 49, 50, 138, 140–141, 605; 75/21, 28, 72, 80, 82

[56] References Cited

U.S. PATENT DOCUMENTS 2,425,995  9/1947  Christensen ............................ 23/97
3,028,233  4/1962  Schaefer ................................. 75/112
3,764,493  10/1973 Nicks et al. ......................... 204/64 R
3,894,927  7/1975  Kane ..................................... 204/64 R
3,901,775  9/1975  Kane ..................................... 204/105 M
3,940,470  2/1976  Kane et al. ............................. 423/49
4,144,056  3/1979  Kruesi ................................... 75/111

OTHER PUBLICATIONS

"Pyrochemical Solvolysis of Ore-Bound Transition Metals", 1985.
"Pyrochemical Extraction of Transition Metals from Pac. Ocean Deep Sea Nodules". (1987)

Primary Examiner—R. L. Andrews
Attorney, Agent, or Firm—William Lohff; James W. Weinberger; Judson R. Hightower

[57] ABSTRACT

A process for extracting transition metals and particularly cobalt and manganese together with iron, copper and nickel from low grade ores (including ocean-floor nodules) by converting the metal oxides or other compositions to chlorides in a molten salt, and subsequently using a combination of selective distillation at temperatures below about 500° C., electrolysis at a voltage not more negative than about −1.5 volt versus Ag/AgCl, and precipitation to separate the desired manganese and cobalt salts from other metals and provide cobalt and manganese in metallic forms or compositions from which these metals may be more easily recovered.

5 Claims, No Drawings

MOLTEN SALT EXTRACTION PROCESS FOR THE RECOVERY OF VALUED TRANSITION METALS FROM LAND-BASED AND DEEP-SEA MINERALS

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

This is a continuation of application Ser. No. 044,618 filed May 1, 1987 now abandoned.

BACKGROUND OF THE INVENTION

This invention relates to processes for recovering technologically important base metals from domestic and offshore mineral reserves and more particularly to pyroelectrochemical processes for the recovery of these base metals from ocean-based ores.

There is a long-range incentive to develop practical, economically competitive processes for recovering a number of technologically important base metals from domestic and offshore reserves. Cobalt and manganese are two such metals having important uses in alloys, catalysts and other products in the commercial and military sectors. Ocean-floor nodules represent a potentially valuable source of these metals provided effective processes can be developed for their recovery. In general, these nodules contain other metals which are primarily iron, nickel and copper in addition to cobalt and manganese. A typical composition will contain about 30% Mn, 7% Fe, 1% Ni, 1% Cu and 0.3% Co by weight.

A number of processes have been developed to recover or extract certain of the metals from these ores. U.S. Pat. No. 3,901,775; U.S. Pat. No. 3,894,927; U.S. Pat. No. 3,028,233; U.S. Pat. No. 4,144,056; and U.S. Pat. No. 2,425,995 provide disclosures of general interest regarding these processes. In U.S. Pat. No. 3,901,775, a process is disclosed wherein the chlorides of the various metals are formed from the ocean-floor nodules, vaporized and fractionally condensed with the manganese (in the form of manganese chloride) being recovered by a fused salt electrolysis. The vaporized and condensed cobalt salt is subject to leaching and aqueous ion exchange prior to recovery of the cobalt metal by electrolysis. In U.S. Pat. No. 3,894,927, the ore from the ocean-floor nodules is contacted with a molten salt containing alkali halides and alkaline earth metal halides with the individual metal halides being separated from the reaction mixture by various methods which preferably involve the halides being dissolved in an aqueous solution for recovery by ion exchange and aqueous electrolysis techniques. In U.S. Pat. No. 3,028,233, the process involves a by-product dust from steel production wherein the iron is vaporized as a chloride with the manganese chloride being dissolved in an aqueous medium and subsequently treated to recover the manganese. In U.S. Pat. No. 4,144,056, the process involves the use of ferric chloride with an alkaline metal chloride to convert metal oxides in the ore to the chlorides which are then dissolved in an aqueous medium and the metals recovered by electrolysis. U.S. Pat. No. 2,425,995 primarily relates to the recovery of zinc from zinc ore which is treated by heating the ore in the presence of carbon and at a temperature sufficiently elevated to distill off the zinc chloride. Manganese in the ore is converted to chloride and ultimately recovered as manganese oxide. While each of these references is directed to specific techniques for recovering certain metals from various types of ores, they have particular limitations. In some instances, the distillation is carried out at temperatures above 700° C. The distilled metal chlorides are treated by aqueous separation processes, and in some cases the separated metal chlorides are subjected to electrolysis in the molten state to recover the metal.

Accordingly, one object of the invention is the development of a new process for the recovery of metals from low grade ores and particularly ocean-floor nodules. Another object of the invention is the development of a process with reduced dissolution and distillation temperatures. A third object of the invention is the development of a process for direct electrolysis of valued metals from the molten chloridation bath. These and other objects will become apparent from the detailed description below.

SUMMARY OF THE INVENTION

Briefly, the invention is directed to a process for extracting transition metals including cobalt and manganese together with iron, copper and nickel from low grade ores by converting the metal oxides or other compositions to chlorides in a molten salt, and subsequently using a combination of selective distillation, electrolysis and precipitation to separate the desired manganese and cobalt salts from other metals and provide cobalt and manganese in metallic forms or compositions from which these metals may be more easily recovered. In the process, the ore is added to a molten salt to extract the cobalt, manganese and other metals as chlorides. Distillation is then carried out to remove the iron and copper chlorides at temperatures equal to or below about 500° C. Subsequently, the cobalt and any nickel are recovered by electrolysis of the chloride bath at voltages below about $-1.5$ volt versus Ag/AgCl and preferably below about $-0.3$ volt, with the manganese subsequently being recovered as the oxide by precipitation. Preferably, the bath is filtered before or after electrolysis to remove various components or silica, aluminum and the like to reduce the content of these materials prior to the precipitation of manganese oxide. It is also preferred that the initial components of the molten salt be environmentally acceptable with sea water in order that periodic deep-sea disposal of the process residues may be carried out.

DETAILED DESCRIPTION OF THE PREFERRED EMBODIMENT

In the invention, the ore represented by the ocean-based nodules is reduced in size to small particles in the order of 100 μm and added to the molten salt at 450° to 500° C. The salt is composed of one or more alkali metal and/or alkaline earth metal halides and preferably chlorides such as NaCl, LiCl, KCl, $MgCl_2$, $CaCl_2$, $BaCl_2$ and the like. Low-melting mixtures and particularly eutectics of LiCl, NaCl, KCl, $MgCl_2$ and their mixtures are preferred with eutectics melting at or below about 400° C. being particularly preferred such as mixtures of NaCl, KCl and $MgCl_2$, which usually result in essentially all of the Co, Cu, Fe, Mn and Ni being brought into solution. The quantity of molten salt is sufficient to convert the metal oxides to chlorides (including complexes) and dissolve the chloride salts. Usually a weight ratio of salt to ore in the range of about three-to-one is suitable with values of about five to one being preferred. The time of contact for nearly complete dissolution of the desired metals is in the order of about 4 to 6 hours. The undissolved ore may be separated and may be used as landfill or returned to the ocean.

Selective distillation is then carried out at temperatures of about 500° C. to remove the more volatile metal chlorides such as those of iron and copper which have significant vapor pressures at about 500° C. The vaporized salts are then condensed and may be processed further to produce either a metal or a concentrated or purified compound of the metal suitable for market applications.

A selective electrolysis is then carried out at one or more voltages below about −1.5 volt versus Ag/AgCl to separate additional metals which are primarily nickel and cobalt. With the voltage below about −1.5 volt, electrolysis of the chlorides in the molten salt bath is substantially avoided. After the nickel has been deposited as a nickel-rich product at about −0.1 volt versus Ag/AgCl, the potential is raised to about −0.3 volt versus Ag/AgI and cobalt is deposited as a cobalt-rich product on fresh graphite electrodes.

The remaining metal is primarily manganese which may be precipitated as $Mn_2O_3$. In order to reduce contamination of the $Mn_2O_3$ by residues of silica, aluminum and the like, the salt is filtered either before or after the electrolysis. Following the filtration and electrolysis, the bath is treated with dry air or oxygen to precipitate the manganese as $Mn_2O_3$. Manganese metal may then be recovered by conventional reduction techniques.

Following the above processing, the chloridation bath salt may be recycled for use with a fresh charge of ore to extract and separate the desired metals.

The following example is provided for illustrative purposes and is not intended to be restrictive as to the scope of the invention:

EXAMPLE I

A process is carried out to recover certain transition metals from ocean-based nodules. These nodules have the following typical analysis by weight percent for metals at a content of 0.1 wt.% or above:

| Al | 2.4 | Mn | 30.0 |
|---|---|---|---|
| Ba | 0.3 | Mo | 0.1 |
| Ca | 1.5 | Ni | 1.3 |
| Co | 0.2 | Sr | 0.1 |
| Cu | 1.1 | Ti | 0.3 |
| Fe | 6.7 | V | 0.1 |
| Mg | 1.8 | Zn | 0.2 |

The nodules are approximately 0.1 to 20 cm. in size and are reduced by grinding so that the largest particles are less than about 100 μm. A molten salt bath is prepared from a mixture of NaCl, KCl and $MgCl_2$ having the following weight percentages of each salt, 19% NaCl, 22% KCl and 59% $MgCl_2$, and heated to about 450° to 500° C. The nodules (about 1 gm) as reduced in size are added to the molten salt in a weight ratio of about 5 parts salt to one part ore. After about six hours, the extraction of the significant transition metals is essentially complete as indicated by post extraction chemical analysis.

Removal of the iron and copper chlorides by distillation is carried out with the molten salt bath at a temperature of about 500° C. for a time of about six hours with the vaporized metal chlorides being assisted by sparging of the bath with an inert gas (nitrogen or argon) which sweep the vapors out of the bath and into a condenser from which the iron and copper chlorides are subsequently recovered. Electrolysis of the nickel and cobalt is then carried out at voltages of about −0.1 volt and −0.3 volt versus Ag/AgCl and with the deposited metals forming on separate graphite cathodes.

The molten salt bath is then filtered to remove undissolved residue and treated with dry air or oxygen at a temperature of about 500° C. to convert the manganese chloride to the oxide ($Mn_2O_3$).

As indicated above, the process of the invention results in an advantageous separation of iron and copper by distillation, followed by recovery of the nickel and cobalt by electrolysis and the manganese by precipitation.

The foregoing description of embodiments of the invention has been presented for purposes of illustration and description. It is not intended to be exhaustive or to limit the invention to the precise form disclosed, and obviously many modifications and variations are possible in light of the above teaching.

The embodiments of this invention in which an exclusive property or privilege is claimed are defined as follows:

1. A process for recovering at least three transition metals from an ore by direct dissolution of the ore in a molten salt comprising the steps of
   combining the ore with said molten salt containing mixed alkali or alkaline earth metal chlorides or mixtures thereof to dissolve the transition metals as chlorides in the molten salt, the salt being at a temperature of not more than 500° C.,
   removing at least one transition metal chloride from the molten salt by distillation at a temperature below about 500° C.,
   electrolytically recovering at least a second transition metal from the molten salt at a voltage with respect to Ag/AgCl that is not more negative than about −1.5 volts, and
   treating the remaining molten salt with a source of oxygen to precipitate an oxide of at least a third transition metal.

2. The process of claim 1 wherein the separation of a second transition metal is carried out at a voltage of not more negative than about −0.5 volt and subsequently at a voltage not more negative than about −1.5 volts to separate a fourth metal.

3. The process of claim 2 wherein the combining step is carried out in a chloride eutectic having a melting temperature below about 400° C.

4. The process of claim 3 wherein the one transition metal is iron, the second transition metal is nickel, and the third transition metal is manganese, and the process includes a step of filtering the molten salt following the distillation step and prior to the precipitation step.

5. The process of claim 4 wherein copper is also removed during the distillation step and cobalt as the fourth transition metal is also separated during the electrolytic separation step.

* * * * *